Patented July 19, 1932

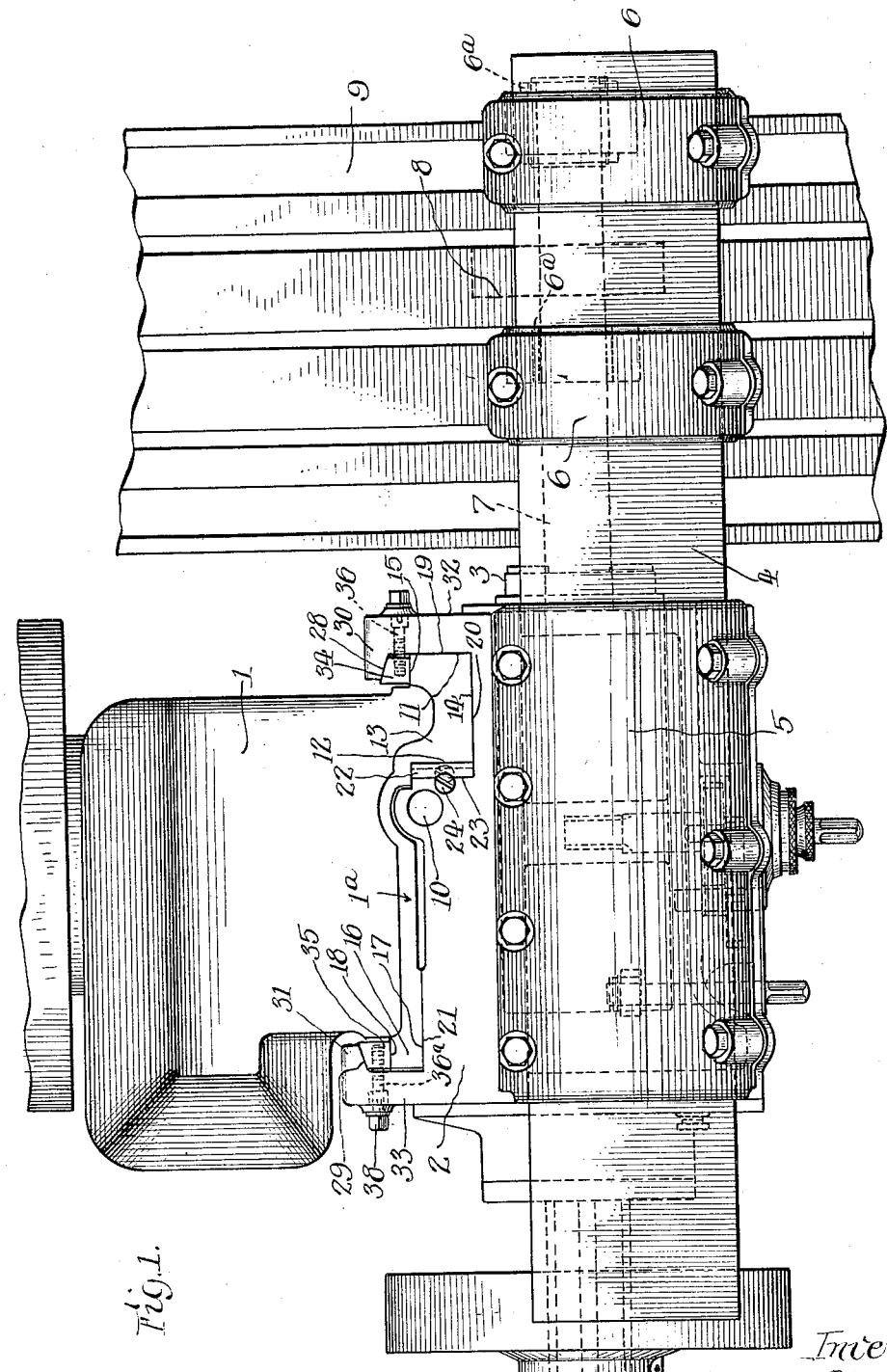

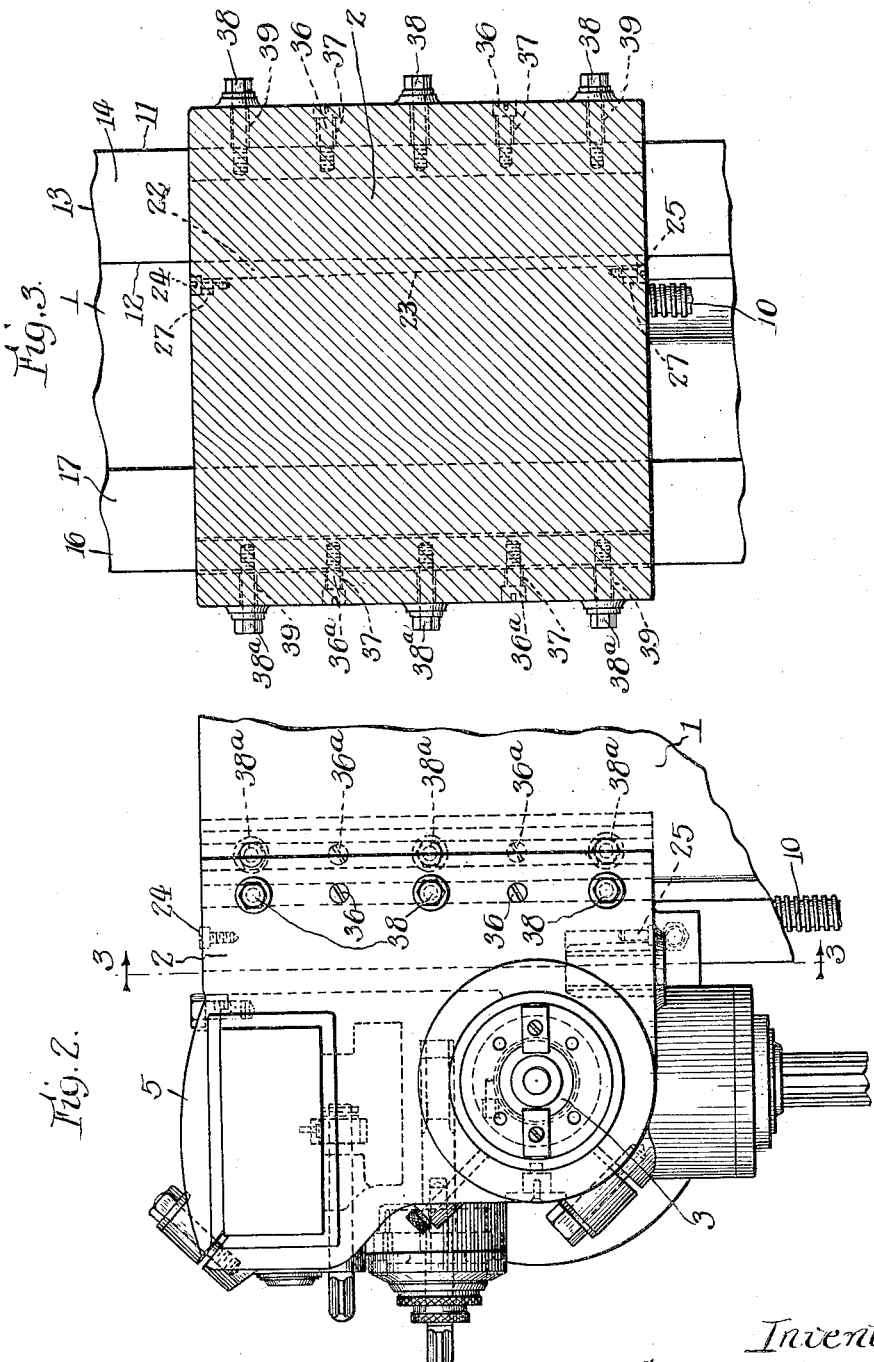

1,867,616

UNITED STATES PATENT OFFICE

CHARLES B. DE VLIEG, OF ROCKFORD, ILLINOIS, ASSIGNOR TO SUNDSTRAND MACHINE TOOL CO., OF ROCKFORD, ILLINOIS, A CORPORATION OF ILLINOIS

MACHINE TOOL

Application filed April 1, 1927. Serial No. 180,171.

This invention relates to means for mounting a slide on a support and more particularly to the provision of such means for a support and a tool carrying saddle construction for a machine tool.

It is the general object of the invention to provide new and improved means for supporting and clamping a slidable saddle on the frame of a machine.

Another object of the invention is to provide a new and improved guide and gib construction for a slidable saddle which will prevent the thrusts upon the saddle from lifting the saddle from its supporting ways.

Another object is to embody in a milling machine an improved construction in which the alinement of the cutter with the main frame of the machine is dependent upon a head slidable upon the column of the machine and having opposed parallel surfaces engaging narrow guides thereon.

A further object is to provide a saddle and its support with effective narrow guides for alinement purposes and a wide bearing surface, together with a novel arrangement of clamping gibs and integral portions of the head to back up said gibs.

Further objects and advantages of the invention will become apparent from the following detailed description of the invention taken in connection with the accompanying drawings, in which Figure 1 is a fragmental plan view of a milling machine.

Fig. 2 is a fragmental front elevation thereof.

Fig. 3 is a section taken along the lines 3—3 of Fig. 2.

While my invention is susceptible of embodiment in many different forms, I have shown in the drawings and will herein describe in detail one such embodiment incorporated in a milling machine with the understanding that the present disclosure is to be considered as an exemplification of the principles of the invention which is equally well adapted for incorporation in other types of machine tools, and is not intended to limit the invention to the embodiment illustrated. The scope of the invention will be pointed out in the appended claims.

In the embodiment of the invention selected for purposes of disclosure, a support 1, illustrated as the column of a milling machine has a head or saddle 2 slidably mounted thereon for vertical adjustment. This saddle has a spindle 3 rotatably mounted therein and carries a forwardly projecting overarm 4 which may be secured to the saddle in any preferred manner such as by means of a clamping block 5. Hangers 6 suspended from the overarm 4 have the usual bearings 6ª therein arranged to provide outboard supports for an arbor 7 on opposite sides of a cutter 8 so as to support the arbor from the overarm and thereby resist deflection of the arbor when the cutter is taking a heavy cut. A work support or table 9 may be mounted in a well known manner for movement transversely of the column, on a horizontal portion of the bed of the machine (not shown) which bed may be cast integrally with the column 1. The head 2 is adjustable upon the column in a direction perpendicular to the table 9 by means including a screw 10.

In its preferred form the invention contemplates a support or column having a wide bearing face in combination with narrow guides to insure alinement and novel clamping means to secure the saddle or head rigidly thereto. Thus the column 1 illustrated in the drawings has a wide bearing face 1ª upon which the head 2 is movably mounted and means are provided adjacent the front of the column and also adjacent the rear of the column having opposed slideways thereon to form narrow guides. Adjacent the front of the column this means is shown comprising a rib 13 extending longitudinally of and formed integrally with the column, said rib having opposed parallel slideways 11 and 12 thereon forming a narrow guide on the face of the column. A pair of opposed slideways 14 and 15 on the rib, herein illustrated as being parallel to each other, form a guide on the front of the column which, as hereinafter brought forth, is arranged to engage parts on the head 2 to resist forces transverse to the axis of the spindle. A third narrow guide 16 adjacent the rear of the column is also arranged to engage parts of the head to resist forces transverse to the axis of the spindle. This guide has opposed slideways 17 and 18 thereon parallel to the face of the column.

The head 2 is slidable vertically upon the column 1, the slideways on the column extending throughout the adjustment range of the head, and is provided with means thereon arranged slidably to engage the above mentioned slideways and to clamp the head on the column. As illustrated herein, the side of the head which is adjacent the column is provided with integral surfaces engaging one each of the slideways formed on the narrow guides and is formed with integral portions which back up gibs which are carried on the head and engage the respective opposed surfaces of said guides. Thus, surfaces 19 and 20 on the head 2 engage the slideways 11 and 14 of the guides on the face and front of the column and a surface 21 on the head engages the slideway 17 on the guide 16 on the rear of the column.

The gib structures now to be described are adapted to clamp the head to the column with the surfaces 19, 20 and 21 in engagement with the guide slideways 11, 14 and 17 respectively so as to insure alinement of the head on the column and to secure the head rigidly thereto.

A tapered gib 22 is positioned intermediate a tapered surface 23 on the head 2 and the slideway 12 (Fig. 3) and is provided with adjusting screws 24 and 25 by means of which the gib may be adjusted to provide a snug sliding fit of the head on the guide slideways 11, 12. These screws are in threaded engagement with the head and have round heads, the under surfaces of which engage the opposite ends of the gib to support the gib on the head for movement therewith. Apertures 27 are provided to permit the heads of the screws to enter the head 2.

The head 2 is also provided with surfaces 28 and 29 opposed to the slideways 15 and 18 of the guides on the column. As disclosed herein, these surfaces are formed on the leg portions 30 and 31 of L section flanges 32 and 33 which are integral with the head and are beveled with respect to the said slideways. Wedge shaped gibs 34 and 35 are positioned intermediate these beveled surfaces and the opposing slideways and are supported upon the head by means of a plurality of filister headed countersunk adjusting screws 36 and 36$^a$, the screws being entered through apertures 37 in the head flanges 32 and 33 and into screw threaded engagement with the gibs. By means of these screws the gibs may be adjusted so that the head 2 has a snug sliding fit upon the column suitable for ordinary cuts. In order, however, that the head may be clamped rigidly to the column such as is desirable when taking heavy cuts, separate means is preferably provided so that during the clamping and unclamping of the head the adjustment of the means for securing the normal snug sliding fit is not disturbed. As illustrated herein this means comprises a plurality of headed clamping screws 38 and 38$^a$ which are entered through apertures 39 in the flanges 32 and 33 of the head and into screw threaded engagement with the gibs 34 and 35. These may be tightened to clamp the head more rigidly to the column, the adjusting screws 36, 36$^a$ then moving in the apertures 37. Upon releasing the clamping screws the gibs again assume their normal positions as determined by the adjusting screws.

A reference to the drawings will disclose that with the taper gib 22 adjusted to a snug sliding fit on the slideway 12, any vertical stresses upon the cutter arbor will be resisted by the engagement of the head surface 19 and the gib upon the opposed slideways 11, 12 of the guide on the face of the column. By positioning this guide adjacent the front of the column, it being of a thickness sufficient to give it the required mechanical strength, the effective leverage of the arbor and overarm from the cutter to the guide is reduced to a minimum. It will also be apparent that with the slideways on this guide positioned close together instead of, for example, at the front and rear of the column, the forces acting on the slideways due to upward pressure on the cutter act at an angle more nearly perpendicular thereto and therefore have a lesser tendency to tip the head.

The narrow guides 13 and 16 on the front and rear of the column function similarly to resist forces which tend to separate the head from the face of the column. In addition to this, however, it will be evident that with the slideways 15, 18 formed parallel to the face of the column, upward pressure upon the cutter will have no tendency to pry the flange portions 30, 31 away from the column slideways 15 and 17 and that any adjustment of the taper gib 22 will not affect the fit of the wedge gibs 34, 35.

The beveled sides of the wedge gibs are preferably at a small angle to the face of the column so that any stresses on the gibs are not borne directly by the adjusting or clamping screws, the larger component of the stress being borne by the integral flange portions of the head.

I claim as my invention:

1. In a milling machine having a column, a table slidable transversely in front of said column, and a head slidable vertically on a side face of the column and arranged to support a cutter arbor extending forwardly from the head across said table, and means for slidably supporting and clamping the head on said column, said means comprising a narrow guide along the forward edge of said column having two pairs of vertically extending opposed slideways, one pair being parallel and the other pair perpendicular to the axis of the cutter, a second narrow guide along the rear edge of said column providing opposed vertically extending slideways parallel to the cutter axis, surfaces on integrally formed parts of said head slidably engaging one of each of said pairs of slideways, integrally formed portions on said head positioned in opposing relation to the other one of each pair of slideways, adjustable gibs interposed between said integral portions of the head and the adjacent slideways, adjusting means for said gibs, the gibs opposing the front and rear surfaces which are parallel to the cutter axis being wedge-shaped in horizontal cross section, and clamping screws engaging said last mentioned gibs and projecting from the front and rear sides of the head so that the head may be conveniently clamped in position.

2. In a milling machine having a column, a table slidable transversely in front of said column, and a head slidable vertically on a side face of the column and supporting a cutter arbor extending forwardly from the head across said table, the combination of means for slidably supporting and clamping the head on said column, said means comprising a narrow guide in the form of a rib of rectangular cross section merging at one corner with the column and projecting from said corner so that its four outer surfaces provide a pair of opposed parallel slideways parallel to the face of said column and a pair of opposed slideways perpendicular to the said face, a second narrow guide along the rear edge of said column providing opposed vertically extending slideways parallel to the face of the column, surfaces on integrally formed parts of said head slidably engaging one of each of said pairs of slideways, integrally formed portions on said head positioned in opposing relation to the other one of each pair of slideways, adjustable gibs interposed between said integral portions of the head and the adjacent slideways, adjusting means for said gibs, and clamping screws engaging certain of said gibs so that the head may be conveniently clamped in position.

In testimony whereof, I have hereunto affixed my signature.

CHARLES B. DE VLIEG.